April 18, 1939.    J. McCLAIN    2,154,819
GAUGE GLASS ILLUMINATING DEVICE
Filed Aug. 22, 1936
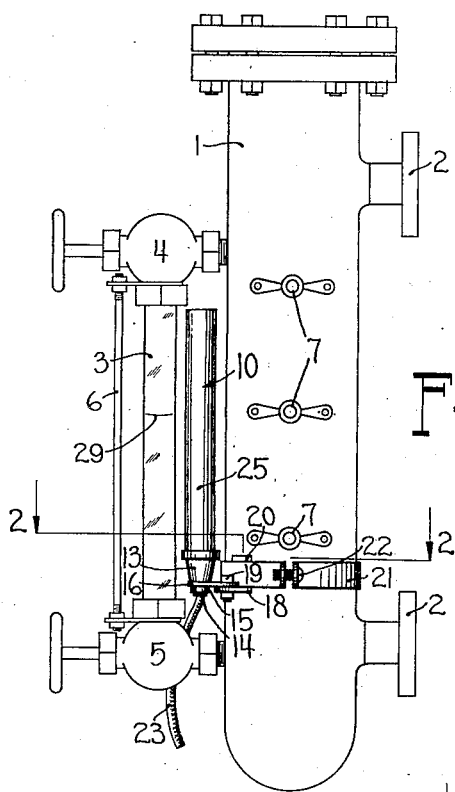
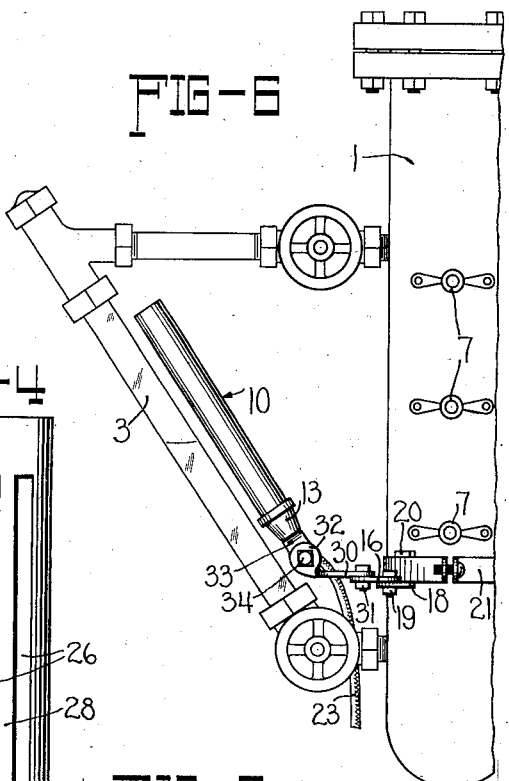
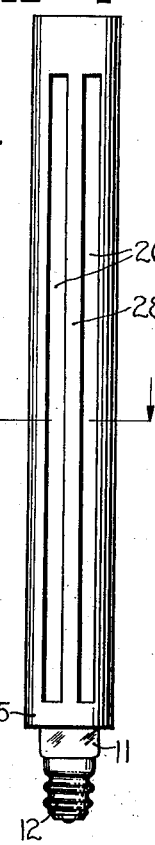
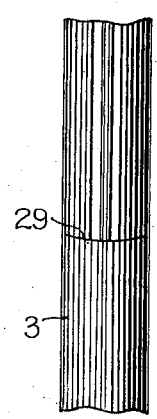
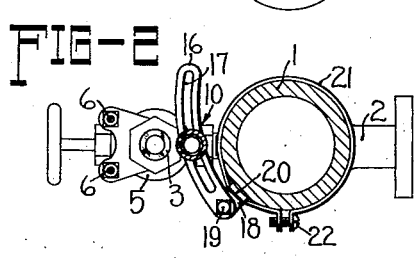
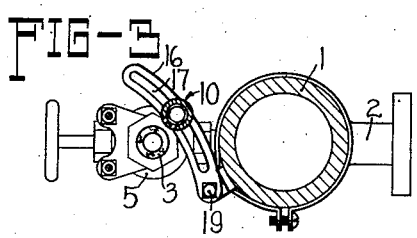
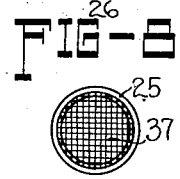
INVENTOR
JOHN McCLAIN.
BY C. T. Parker
ATTORNEY
WITNESS.
Edward M Melin.

Patented Apr. 18, 1939

2,154,819

UNITED STATES PATENT OFFICE 2,154,819

GAUGE GLASS ILLUMINATING DEVICE

John McClain, Chicago, Ill.

Application August 22, 1936, Serial No. 97,404

8 Claims. (Cl. 73—293)

The present invention relates to gauge glass illuminating devices.

It is well known that the level of colorless liquid in a gauge glass is difficult to distinguish, especially at any appreciable distance from the glass. In certain instances, notably in the case of steam boilers, it is highly important to maintain the proper level, and to this end it is desirable that the level of liquid in the gauge glass be easily distinguishable at a distance.

Many attempts have been made to provide means for distinguishing the liquid level in the glass. Much of this prior art is directed to placing a colored background of distinctive pattern behind the glass, the liquid in the glass acting as a lens to magnify the pattern in the background, thereby distinguishing from the empty portion of the glass. This type of attachment has two principal disadvantages. One is, that boiler gauge glasses become dirty rather quickly and then any type of background is indistinguishable through the glass from a distance. The other is, that those devices in the prior art which consist of background distinguishing means, are fixed either to the gauge glass itself, or to its fittings. As the gauge glass is one of the weakest points in a steam boiler, it is desirable that the gauge glass be free from all irregularities in its construction and from attachments after its installation. Consequently, many steam boiler engineers object to any devices attached to the gauge glass or to its fittings.

In order to avoid the first mentioned disadvantage of background distinguishing devices, other devices have been designed which function on the principle of directing light through the gauge glass. This principle, while it is more effective than mere background plates, does not entirely avoid this objection, because as a gauge glass approaches a nearly translucent condition, (many glasses actually exist in this condition in daily operation), even distinctive light patterns become rather obscure, making it difficult to quickly pick out the liquid level in the glass.

Devices have been produced which avoid this difficulty by using the different indices of refraction in liquid and in steam, or two different liquids, to transmit light from sources of different colors through the water and the steam. Such a device is, however, complicated and expensive.

The principal object of the present invention is to provide a simple and inexpensive device for distinguishing the level of liquid in a gauge glass, regardless of whether the glass is dirty or clean.

Another object is to provide a device which is separate from and independent of the gauge glass and its fittings.

A further object is to provide a device for this purpose, which can be installed with existing gauge glasses, and which requires little space so that it may be installed between the gauge glass and the water column.

In accomplishing these objects, I have recognized that even in the case of glasses which are so dirty and discolored as to be practically translucent, although no pattern of background or even distinctive pattern of light could be seen through the glass, the difference between light and dark can always be distinguished.

Hence it is another object of my invention to produce a device which will cause that portion of the glass containing liquid to appear dark, and that portion above the liquid level to appear bright.

Other objects will become apparent to those skilled in the art after a consideration of the following description and explanation, reference being had to the drawing appended hereto in which—

Figure 1 is an elevation showing a device embodying the principles of my invention as applied to a gauge glass on a water column;

Figure 2 is a sectional plan taken along a line 2—2 in Figure 1;

Figure 3 is a view similar to Figure 2 but in which the device is adjusted for viewing it from a different angle;

Figure 4 is an elevation of a lamp and opaque hood;

Figure 5 is a fragmentary elevation of a gauge glass showing the appearance thereof at the water level effected by a device of the present invention;

Figure 6 shows another embodiment of my invention in elevation;

Figure 7 is a section taken along a line 7—7 in Fig. 4; and

Figure 8 is an end view of the hood.

In the drawing and specification like numerals refer to like parts throughout.

Referring now to Figure 1, reference numeral 1 indicates a water column, having flanged openings 2 adapted for connection to a boiler. A gauge glass 3 of conventional type is supported between two valve fittings 4, 5, respectively, with conventional protecting tie-rods 6 extending vertically in front of the glass 3. Conventional blow-off cocks are indicated at 7.

A gauge glass illuminating device, indicated in its entirety by the reference numeral 10, is disposed adjacent to the gauge glass 3, and comprises a long tubular electric lamp 11, preferably of the incandescent type although it may be of the gaseous discharge type, commonly known as a "neon" lamp. As the lamp shown is of the incandescent type, it is provided with a conventional threaded terminal 12 (see Figure 4) which cooperates with and is supported in a socket 13. The socket has a threaded stem 14 which is fitted with a lock nut 15. The socket is supported on a supporting member 16 which is generally horizontally disposed and slightly curved, and has a slot 17 extending longitudinally thereof, the slot being also curved in a horizontal plane. The slot is adapted to receive the stem 14 of the socket, which extends through the slot and is engaged by the nut 15, firmly tightened to hold the socket upright on the member 16. When the nut 15 is loosened, the socket can be moved along the slot for purposes of adjustment. A suitable insulated cord 23 connects the socket 13 with a source of current.

The supporting member 16 is pivoted at one end to a bracket 18 by a pivot bolt 19, which can be tightened to prevent the member 16 from turning, after it is once adjusted. The bracket 18 has a vertically extending flange 20 which is secured to the water column 1 by a strap 21 which embraces the water column and is held tightly by a bolt 22.

Closely embracing the lamp 11 is a tubular hood 25, made of metal, fiber, or any suitable opaque material which can withstand the heat of the lamp, or it can be a heat-resisting coating on the lamp itself of enamel or the like. A pair of parallel elongated openings or slots 26 in the hood 25 extend longitudinally, leaving an opaque strip 28 in the center, which is preferably wide enough to cover the filament, thereby preventing glare.

The effect of the parallel slots when viewed through the gauge glass is illustrated in Figure 5. Below the liquid level 29, the liquid in the glass acts as a lens to magnify the image of the center strip 28 in the hood. By suitably proportioning the sizes of the slots 26 and strip 28 and the distance between the glass 3 and the lamp 11, the image of the strip 28 can be so magnified that it covers the entire width of the glass 3, making that portion of the glass dark. That is to say, the light directed through the slots 26 falling upon the glass 3 is refracted outwardly and away from a point of view in line with the glass and lamp, therefore that portion of the glass appears dark. As indicated in the drawing, the total width of the slotted portion of the hood is less than the outside diameter of the gauge glass, so that all of the light rays from the lamp received at the point of view passed through the gauge glass.

Above the meniscus 29 the effect of the empty glass tube 3 is to diminish the size of the slots 26 and strip 28, therefore the two light-directing slots appear as parallel lines of light as illustrated. It is now evident that even though the glass be very dirty, the upper portion of the glass will appear bright while the lower portion of the glass under the water level will appear dark. Furthermore, when the tube is empty the entire tube will appear bright, thus giving a positive indication of a condition that is often dangerous, serving to call attention to a low water level in a boiler.

Figures 2 and 3 indicate some of the positions of the illuminating device 10 relative to gauge glass 3 that are made possible by means of the supporting member 16. In the case of most existing installations of gauges on boilers, etc., there is very little space available between the glass 3 and the water column 1, too small in fact, to receive most conventional illuminating devices. It is to be noted that the bracket 20 and the strap bolt 22 are spaced from the gauge glass 3, while the supporting member 16 extends through the space between the glass and the column to support the lamp directly behind the gauge glass, if so desired, as shown in Figure 2, the curvature of the member accommodated to the curve of the cylindrical water column 1.

By removing the bolt 19, the member 16 may be reversed as shown in Figure 3 to allow the illuminating device to be moved around to one side of the glass 3. By adjustments of the location of the bracket 18 around the periphery of the column, by pivoting the member 16 in the bracket 18, and by moving the socket 13 in the slot 17, a wide range of adjustment of the lamp relative to the glass may be obtained to obtain the proper focus and the proper angle of vision.

Figure 6 shows how another adjustment may be incorporated for adjusting the angle of the device 10 with the vertical. Here the glass 3 is set at an angle in accordance with common practice. An additional extension member 30 is fastened to the supporting member 16 by a bolt 31 disposed within the slot 17. The member 30 has an end 32 that is bent into a vertical plane to which a small angle piece 33 is pivoted by a bolt 34, to which piece the socket is secured. In this embodiment besides the adjustments described in connection with Figure 1, the lamp may be pivoted around the bolt 34 to accommodate the lamp to the angle of inclination of the gauge glass 3.

Figure 7 shows a method of providing for ventilation between the lamp and the hood. The hood 25 is made with an internal diameter somewhat greater than the diameter of the lamp 11, thus providing a space 35 between the hood and the lamp, which extends vertically to the top of the hood. Felt spacers 36 in the form of long strips, extending substantially the full length of the hood, determine the position of the hood and act to center the lamp within the hood. As the spacers are resilient they allow for expansion and contraction of the lamp and hood and also absorb shocks received by the hood to prevent breakage of the lamp. The chimney effect of the air space 35 prevents overheating. Cold air is admitted to the space at the bottom end of the hood and rises to the top of the hood where it escapes through a screen 37 (Figure 8) which is provided at the upper end of the tubular hood for protection of the lamp against breakage.

I do not intend my invention to be limited to the precise details shown and described herein except as set forth in the following claims.

I claim:

1. An illuminating device for a gauge glass, said device comprising in combination, a tubular lamp, an opaque hood therefor, said hood having a plurality of longitudinally disposed parallel slots, and means for supporting said lamp parallel to and adjacent said gauge glass, the width of the slotted portion of said hood being no greater than the outside diameter of said gauge glass.

2. An illuminating device for a gauge glass, said device comprising in combination, an elongated lamp, an opaque hood therefor, said hood having two slots extending longitudinally of said hood with an opaque strip between said slots, the distance between the outer edges of said slots being equal to, or less than the diameter of said gauge glass, and means for supporting said lamp parallel to and adjacent said gauge glass with said opaque strip interposed between said lamp and said gauge glass, said supporting means including means for adjusting the position of said lamp relative to said gauge glass.

3. An illuminating device for a gauge glass, said device comprising in combination, an elongated lamp, an opaque hood therefor, said hood having two slots extending longitudinally of said hood with an opaque strip between said slots, and means for supporting said lamp parallel to and adjacent said gauge glass, said supporting means including means for adjusting the distance between said lamp and said glass, to produce a magnified image of said opaque strip, as viewed through liquid in said gauge glass, that is substantially as wide as said glass, the width and spacing of said slots being such that the latter are disposed within the width of said gauge glass.

4. In combination with a water column having a gauge glass inclined with respect to said column and supported in fittings in communication therewith, an elongated tubular lamp disposed adjacent said gauge glass, a socket member for supporting said lamp, an extension member adjustably fixed to said socket member by horizontal pivot means, an elongated curved horizontal supporting member having a slot, means slidable within said slot for adjustably securing the extension member to said supporting member, a bracket member, means for securing one end of said supporting member to said bracket member, said securing means providing adjustment of said lamp toward and away from said gauge glass, and strap means embracing said water column for securing said bracket thereto.

5. In combination with a water column having a gauge glass inclined with respect to said column and supported in fittings in communication therewith, an elongated lamp disposed adjacent said gauge glass, a hood for said lamp provided with light-directing openings therein, a socket member for supporting said lamp, an extension member adjustably fixed to said socket member by horizontal pivot means, an elongated curved horizontal supporting member having a slot, a bracket member, means for pivotally securing one end of said supporting member to said bracket member, and strap means embracing said water column for fixing said bracket thereto, means slidably adjustable within said slot for adjustably securing the extension member to said supporting member, and said supporting member being angularly adjustable on said bracket toward and away from said gauge glass, to set the lamp parallel to said gauge glass at the proper distance from the glass to produce an optical effect when viewed from a predetermined angle, which distinguishes that portion of said glass filled with liquid.

6. A gauge glass illuminating device comprising in combination, an elongated lamp, and a hood therefor, said hood having light-directing openings adapted to direct light upon one side of said gauge glass in such manner that substantially all of said light falling upon said glass below the level of liquid therein is refracted away from a predetermined point of view at the opposite side of said glass while light falling above said liquid level is transmitted through said glass to said point of view, said openings being of suitable width and spacing, whereby all direct rays of light from the lamp to said point of view pass through said glass.

7. An illuminating device for a gauge glass, said device comprising in combination, a tubular lamp, a light restricting enclosure therefor, and means for supporting said lamp substantially parallel to the gauge glass on the opposite side thereof relative to a predetermined point of view, there being a plurality of light transmitting strips in said enclosure extending parallel to said gauge glass, said strips being disposed entirely within the width of said gauge glass.

8. An illuminating device for a gauge glass, said device comprising in combination, an elongated lamp, a light interrupting enclosure therefor, and means for supporting said lamp parallel to and adjacent said gauge glass, there being two light transmitting strips in said enclosure extending longitudinally thereof and spaced apart with a light interrupting strip therebetween, the distance between the outer edges of said light transmitting strips being equal to, or less than the diameter of said gauge glass, whereby, when viewed from a certain point of view, the gauge glass entirely covers the light transmitting strips in the enclosure.

JOHN McCLAIN.